United States Patent
Auer et al.

(10) Patent No.: US 10,411,862 B2
(45) Date of Patent: Sep. 10, 2019

(54) INSERTING AND EXTRACTING CONTROL DATA USING FREQUENCY COMPONENTS

(71) Applicant: TELEFONAKTIEBOLAGET LM ERICSSON (PUBL), Stockholm (SE)

(72) Inventors: Gunther Auer, Stockholm (SE); Miguel Berg, Upplands Väsby (SE); Tsao-Tsen Chen, Täby (SE); Elmar Trojer, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 15/572,073

(22) PCT Filed: May 6, 2015

(86) PCT No.: PCT/SE2015/050501
§ 371 (c)(1),
(2) Date: Nov. 6, 2017

(87) PCT Pub. No.: WO2016/178606
PCT Pub. Date: Nov. 10, 2016

(65) Prior Publication Data
US 2018/0294939 A1    Oct. 11, 2018

(51) Int. Cl.
*H04L 5/00* (2006.01)
*H04L 27/26* (2006.01)
*H04W 72/04* (2009.01)

(52) U.S. Cl.
CPC ............ *H04L 5/0053* (2013.01); *H04L 5/001* (2013.01); *H04L 5/0032* (2013.01);
(Continued)

(58) Field of Classification Search
CPC ..... H04L 5/0053; H04L 5/001; H04L 5/0032; H04L 27/2602; H04L 27/2628; H04W 72/0426
See application file for complete search history.

(56) References Cited

U.S. PATENT DOCUMENTS

| 5,822,372 A * | 10/1998 | Emami | H04L 5/0007 |
| | | | 375/260 |
| 2005/0054319 A1* | 3/2005 | Tamaki | H04L 27/34 |
| | | | 455/296 |

(Continued)

FOREIGN PATENT DOCUMENTS

| WO | 2014076004 A2 | 5/2014 |
| WO | 2016128023 A1 | 8/2016 |
| WO | 2016153396 A1 | 9/2016 |

OTHER PUBLICATIONS

ETSI, "LTE; Evolved Universal Terrestrial Radio Access (E-UTRA); Physical channels and modulation(3GPP TS 36.211 version 11.5.0 Release 11)", Technical Specification, Jan. 2014.
(Continued)

*Primary Examiner* — Tejis Daya
(74) *Attorney, Agent, or Firm* — Sage Patent Group

(57) ABSTRACT

A method for inserting control data in a modulator comprising a plurality of frequency component inputs and a modulator output. The method is performed in the modulator and comprises receiving primary data subcarriers on respective frequency component inputs which are assigned for receiving primary data, receiving at least one control data subcarrier on a respective frequency component input which is not assigned to primary data, combining all frequency component inputs to one output signal, and providing the output signal on the output for transmission to a demodulator over a point-to-point medium.

18 Claims, 5 Drawing Sheets

(52) U.S. Cl.
CPC ..... *H04L 27/2602* (2013.01); *H04W 72/0426* (2013.01); *H04L 27/2628* (2013.01)

(56) References Cited

U.S. PATENT DOCUMENTS

| | | | | |
|---|---|---|---|---|
| 2006/0056540 A1* | 3/2006 | Magee | ............. | H04B 7/0669 375/299 |
| 2007/0081449 A1* | 4/2007 | Khan | ............. | H04W 16/06 370/208 |
| 2007/0189199 A1* | 8/2007 | Nishio | ............. | H04L 5/023 370/328 |
| 2008/0153425 A1* | 6/2008 | Heo | ............. | H04L 1/0004 455/68 |
| 2008/0232307 A1* | 9/2008 | Pi | ............. | H04L 1/1607 370/328 |
| 2009/0103506 A1* | 4/2009 | Bahl | ............. | H04W 72/0406 370/338 |
| 2009/0186645 A1* | 7/2009 | Jaturong | ............. | H04L 5/0007 455/507 |
| 2009/0247180 A1* | 10/2009 | Higuchi | ............. | H04L 1/0003 455/452.2 |
| 2010/0098012 A1* | 4/2010 | Bala | ............. | H04L 5/001 370/329 |
| 2010/0188014 A1* | 7/2010 | Lundstrum | ............. | H03C 3/00 315/291 |
| 2011/0255619 A1* | 10/2011 | Nam | ............. | H04L 1/0031 375/260 |
| 2012/0002580 A1* | 1/2012 | Nakashima | ............. | H04W 52/42 370/311 |
| 2013/0051341 A1* | 2/2013 | Suzuki | ............. | H04L 1/1835 370/329 |
| 2014/0341145 A1* | 11/2014 | Nakashima | ............. | H04W 72/042 370/329 |
| 2016/0128039 A1* | 5/2016 | Lim | ............. | H04L 5/0053 370/330 |
| 2016/0128085 A1* | 5/2016 | Liu | ............. | H01J 14/00 398/96 |

OTHER PUBLICATIONS

Ericsson AB, et al., "CPRI Specification V6.0; Common Public Radio Interface (CPRI); Interface Specification", Aug. 30, 2013, XP055101900.

* cited by examiner

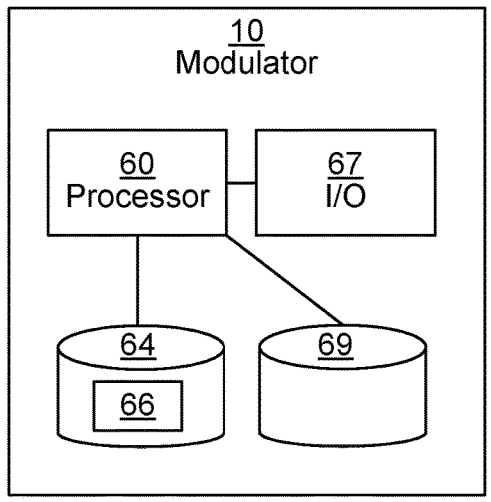
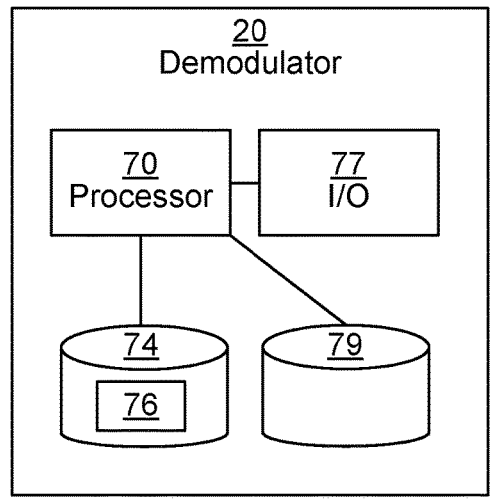
Fig. 8
Fig. 9
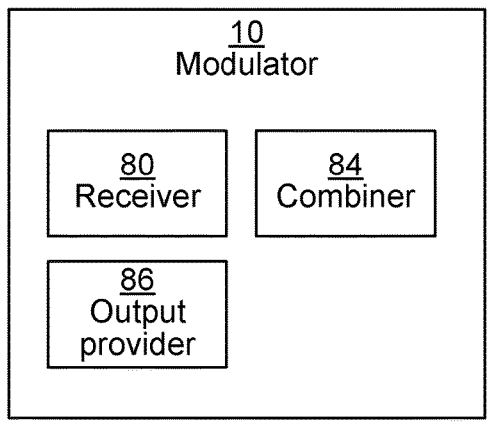
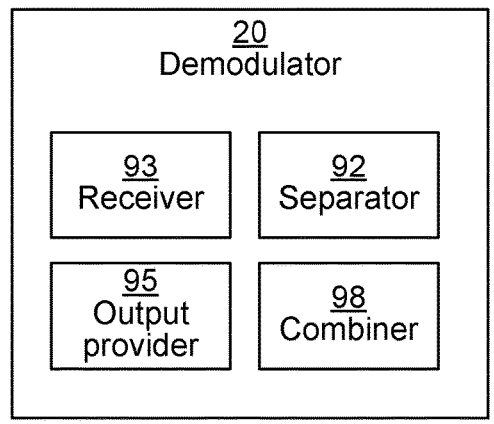
Fig. 10
Fig. 11
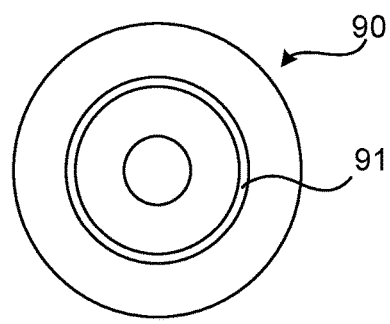
Fig. 12

INSERTING AND EXTRACTING CONTROL DATA USING FREQUENCY COMPONENTS

This application is a national phase of Patent Cooperation Treaty (PCT) patent application No. PCT/SE2015/050501, filed May 6, 2015, the disclosure of which is incorporated herein by reference in its entirety.

TECHNICAL FIELD

The invention relates to methods, modulators, demodulators, computer programs and computer program products for inserting and extracting control data using frequency components over a point-to-point medium.

BACKGROUND

The topology of cellular networks increases in complexity. For instance, remote radio heads can be used in locations where traditional deployment with antennas being co-located with the base stations is not ideal. For example, such a distributed transmission system is particularly useful to increase coverage and reduce handovers in areas with a large concentration of subscribers, such as in office buildings, shopping centres, train stations, airports, arenas, etc.

However, in distributed transmission systems for cellular networks, it is often necessary to convey control data between system components that is not related to the transmitted LTE (Long Term Evolution) signal and is not defined in standards documentation. Such control data consumes additional resources over the communication link between the components, which implies greater link capacity requirements.

SUMMARY

It would be of great benefit if control data not related to the transmitted cellular network signal could be transmitted alongside with the cellular network signal without consuming additional link capacity.

According to a first aspect, it is presented a method for inserting control data in a modulator comprising a plurality of frequency component inputs and a modulator output. The method is performed in the modulator and comprises the steps of: receiving primary data subcarriers on respective frequency component inputs which are assigned for receiving primary data; receiving at least one control data subcarrier on a respective frequency component input which is not assigned to primary data; combining all frequency component inputs to one output signal; and providing the output signal on the output for transmission to a demodulator over a point-to-point medium.

The step of combining may comprise performing an inverse fast Fourier transform and a parallel to serial conversion.

The number of frequency component inputs may be equal to two to the power of an integer.

The step of receiving at least one control data subcarrier may comprise receiving the at least one control data subcarrier on a respective frequency component input for which power needs to be suppressed when transmitted over the air to avoid leakage to a neighbouring frequency band.

The steps of receiving primary data and receiving control data may be performed in parallel.

The method may further comprise the step of: receiving zero signals on frequency component inputs which are neither used for primary data nor for control data.

The primary data subcarriers form part of a transmission signal in accordance with Long Term Evolution, LTE.

According to a second aspect, it is presented a modulator for inserting control data. The modulator comprises: a plurality of frequency component inputs; a modulator output; a processor; and a memory storing instructions that, when executed by the processor, cause the modulator to: receive primary data subcarriers on respective frequency component inputs which are assigned for receiving primary data; receive at least one control data subcarrier on a respective frequency component input which is not assigned to primary data; combine all frequency component inputs to one output signal; and provide the output signal on the output for transmission to a demodulator over a point-to-point medium.

The instructions to combine may comprise instructions that, when executed by the processor, cause the modulator to perform an inverse fast Fourier transform and a parallel to serial conversion.

The number of frequency component inputs may be equal to two to the power of an integer.

The instructions to receive at least one control data subcarrier may comprise instructions that, when executed by the processor, cause the modulator to receive the at least one control data subcarrier on a respective frequency component input for which power needs to be suppressed when transmitted over the air to avoid leakage to a neighbouring frequency band.

The instructions to receive primary data and the instructions to receive control data may be executed in parallel.

The modulator may further comprise instructions that, when executed by the processor, cause the modulator to: receive zero signals on frequency component inputs which are neither used for primary data nor for control data.

The primary data subcarriers may form part of a transmission signal in accordance with Long Term Evolution, LTE.

According to a third aspect, it is presented a modulator comprising: means for receiving primary data subcarriers on respective frequency component inputs of the modulator which are assigned for receiving primary data; means for receiving at least one control data subcarrier on a respective frequency component input which is not assigned to primary data; means for combining all frequency component inputs to one output signal; and means for providing the output signal on an output of the modulator for transmission to a demodulator over a point-to-point medium.

According to a fourth aspect, it is presented a computer program for inserting control data in a modulator comprising a plurality of frequency component inputs and a modulator output. The computer program comprises computer program code which, when run on a modulator cause the modulator to: receive primary data subcarriers on respective frequency component inputs which are assigned for receiving primary data; receive at least one control data subcarrier on a respective frequency component input which is not assigned to primary data; combine all frequency component inputs to one output signal; and provide the output signal on the output for transmission to a demodulator over a point-to-point medium.

According to a fifth aspect, it is presented a computer program product comprising a computer program according to the fourth aspect and a computer readable means on which the computer program is stored.

According to a sixth aspect, it is presented a method for extracting control data in a demodulator comprising a plurality of frequency component outputs and a demodulator input. The method is performed in the demodulator and comprises the steps of: receiving one input signal on the input, the input signal having been transferred from a modulator over a point-to-point medium; separating frequency components of the input signal to the plurality of subcarriers for respective frequency component outputs; providing primary data subcarriers on respective frequency component outputs which are assigned for providing primary data; and providing at least one control data subcarrier on a respective frequency component output which is not assigned to primary data.

The step of separating may comprise performing a serial to parallel conversion and a fast Fourier transform.

The number of frequency component outputs may be equal to two to the power of an integer.

The steps of providing primary data and providing control data may be performed in parallel.

The method may further comprise the step of: combining the frequency components which are assigned for providing primary data and zero signals for frequency components which were used for control data subcarriers.

The primary data subcarriers may form part of a transmission signal in accordance with Long Term Evolution, LTE.

According to a seventh aspect, it is presented a demodulator for extracting control data. The demodulator comprises: a plurality of frequency component outputs; a demodulator input; a processor; and a memory storing instructions that, when executed by the processor, cause the demodulator to: receive one input signal on the input, the input signal having been transferred from a modulator over a point-to-point medium; separate frequency components of the input signal to the plurality of subcarriers for respective frequency component outputs; provide primary data subcarriers on respective frequency component outputs which are assigned for providing primary data; and provide at least one control data subcarrier on a respective frequency component output which is not assigned to primary data.

The instructions to separate may comprise instructions that, when executed by the processor, cause the demodulator to perform a serial to parallel conversion and a fast Fourier transform.

The number of frequency component outputs may be equal to two to the power of an integer.

The instructions to provide primary data and the instructions to provide control data may be executed in parallel.

The demodulator may further comprise instructions that, when executed by the processor, cause the demodulator to combine the frequency components which are assigned for providing primary data and zero signals for frequency components which were used for control data subcarriers.

The primary data subcarriers may form part of a transmission signal in accordance with Long Term Evolution, LTE.

According to an eighth aspect, it is presented a demodulator comprising: means for receiving one input signal on a demodulator input of the demodulator, the input signal having been transferred from a modulator over a point-to-point medium; means for separating frequency components of the input signal to a plurality of subcarriers for respective frequency component outputs of the demodulator; means for providing primary data subcarriers on respective frequency component outputs which are assigned for providing primary data; and means for providing at least one control data subcarrier on a respective frequency component output which is not assigned to primary data.

According to an ninth aspect, it is presented a computer program for extracting control data in a demodulator comprising a plurality of frequency component outputs and a demodulator input. The computer program comprises computer program code which, when run on the demodulator cause the demodulator to: receive one input signal on the input, the input signal having been transferred from a modulator over a point-to-point medium; separate frequency components of the input signal to the plurality of subcarriers for respective frequency component outputs; provide primary data subcarriers on respective frequency component outputs which are assigned for providing primary data; and provide at least one control data subcarrier on a respective frequency component output which is not assigned to primary data.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 8 is a schematic diagram showing some components of an embodiment of the modulator of FIG. 3 according to one embodiment;

FIG. 9 is a schematic diagram showing some components of an embodiment of the demodulator of FIG. 3 according to one embodiment;

FIG. 10 is a schematic diagram showing functional modules of the software instructions of the modulator of FIG. 3 or FIG. 8 according to one embodiment;

FIG. 11 is a schematic diagram showing functional modules of the software instructions of the demodulator of FIG. 3 or FIG. 9 according to one embodiment; and FIG. 12 shows one example of a computer program product comprising computer readable means.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
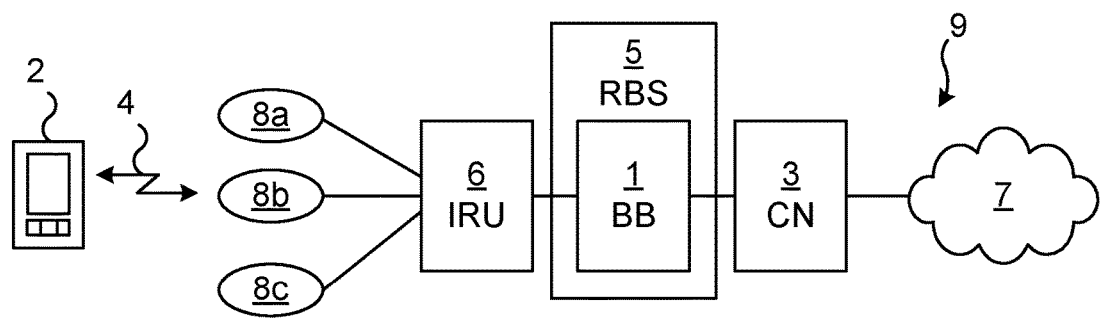
FIG. 1 is a schematic architecture diagram illustrating an environment where embodiments presented herein can be applied.

FIG. 1 is a schematic architecture diagram illustrating an environment where embodiments presented herein can be applied. A cellular communication network 9 comprises a number of remote radio heads (RRHs) 8a-c for installation in locations where traditional deployment with antennas being co-located with the base stations is not ideal, e.g. to increase coverage and reduce handovers in areas with a large concentration of subscribers, such as in office buildings, shopping centres, train stations, airports, arenas, etc.

It is to be noted that, while the embodiments presented herein are described as implemented using LTE (Long Term Evolution) and/or W-CDMA (Wideband Code Division Access), any applicable communication standard may be used, such as any one or a combination of LTE-SAE (Long Term Evolution—System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A radio base station (RBS) 5 here comprises one or more baseband modules (BB) 1. The baseband modules BB can be handled by digital units (DUs) in the RBS 5, where each DU can handle one or more BB modules 1. A combiner 6 is used in the uplink to combine uplink signals from a plurality of remote radio heads 8a-c and forward data to the baseband module 1. In downlink, the combiner 6 may function as a splitter, providing downlink signals from the baseband module 1 to each one of the connected remote radio heads 8a-c. The combiner 6 is also known as an indoor radio unit (IRU). It is to be noted though that the combiner may also be provided outdoors whenever appropriate. The combiner 6 is in this way a link for a number (in this example three) of remote radio heads 8a-c. In this way, the radio base station 5 is a link for uplink and downlink communication for the remote radio heads connected to the combiner 6. One function of the radio base station 5 is to function as a digital unit (DU), using the one or more baseband module 1, for processing uplink and downlink signals in the digital domain. It is to be noted that the combiner 6 may be provided separately from the radio base station 5 (as shown), or integrated within the radio base station (not shown).

The radio base station 5 is also connected to a core network 3. The core network 3 provides central functions and connectivity to external networks 7 such as the Internet and other cellular communication networks.

The remote radio heads 8a-c connected to the combiner 6 can be part of a single radio cell or they can form part of two or more different cells. Antennas do not need to be included in this embodiment of the radio base station 5 or the combiner 6, as the remote radio heads 8a-c provide the antennas for the wireless link 4 to one or more wireless devices 2. The wireless link 4 provided by the remote radio heads 8a-c includes both downlink (DL) communication to the wireless devices 2 and uplink (UL) communication from the wireless devices 2. The term wireless device is also known as mobile communication terminal, user equipment (wireless device), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the combiner 6 and the remote radio heads 8a-c.

It is to be noted that the processing of uplink and downlink signals in the combiner and the remote radio heads 8a-c do not need to occur in the digital domain and can be (but do not need to be) performed completely in the analogue domain.

The remote radio heads 8a-c convert from IF to RF for downlink transmission and from RF to IF for uplink reception. Conversely, the combiner 6 converts from digital BB to IF for downlink transmission and from IF to digital BB for uplink reception.

By using IF instead of RF over the cables between the combiner 6 and the remote radio heads 8a-c, cheaper, widely deployed electrical cables can be used, such as Ethernet LAN cabling. In this way, existing indoor cabling can many times be reused during installation, which significantly saves cost, installation time and complexity. Optionally, the remote radio heads 8a-c are also powered over the respective cables.

The transmission and reception is under the control of the MAC (Media Access Control) scheduler in the baseband module 1. The MAC scheduler informs what transmissions should be made and informs, via the downlink signaling, the wireless devices when to transmit and on which frequency and power.

The link between the combiner 6 and the baseband module 1 utilises a digital signal interface, such as CPRI (Common Public Radio Interface).

It is to be noted that, although FIG. 1 shows the baseband module 1 connected to one combiner 6, each baseband module 1 can be connected to several combiners over separate respective links. It is also possible that several baseband modules 1 are connected to one combiner 6.

It is to be noted that while the embodiment of FIG. 1 shows three remote radio heads 1a-c, there may be fewer or more remote radio heads connected to each combiner 6.

In the environment of FIG. 1, there is a need for control data to be signalled between the baseband module 1 and the combiner 6, between the combiner 6 and the remote radio heads 8a-c and/or between the remote radio heads and the baseband module 1. The signalling of the control data can occur in the downlink (in a direction towards the wireless device 2) or in the uplink (in a direction towards the core network 3). It is to be noted that this control data can be separate from control data defined in the standards documentation (e.g. for LTE) and its structure can be freely designed as part of the implementation of embodiments presented herein. The control data can e.g. relate to configuration of the remote radio heads, measurements from the remote radio heads, frequency configuration for payload data over the IF interface, fault monitoring, etc.

As explained in more detail below, in a point-to-point communication link as utilised here, certain resources can be used for the control signalling which can be used for other purposes of the wireless link 4.

Figure 2:
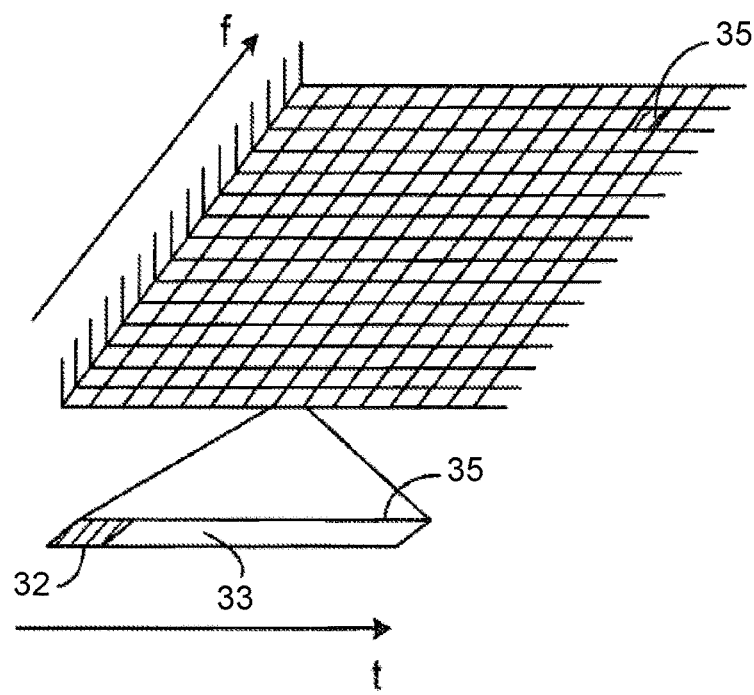
FIG. 2 is a schematic diagram illustrating the physical resources for downlink communication in LTE.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 35 corresponds to one OFDM subcarrier during one OFDM symbol interval. Each resource element 35 comprises cyclic prefix section 32 and a main section 33. The purpose of the cyclic prefix section 32 is to allow reception even when there is time dispersion of the signal, e.g. due to multipath.

Figure 3:
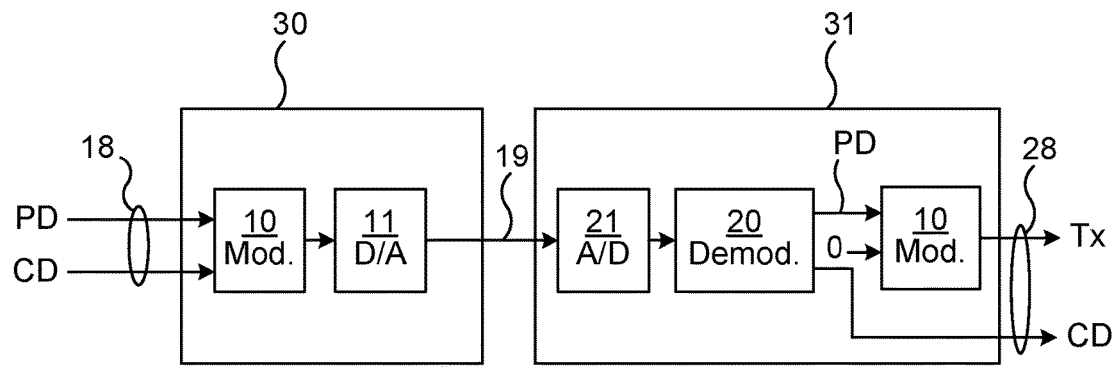
FIG. 3 is a schematic diagram of a system illustrating a transmitter and a receiver over a point-to-point medium according to one embodiment.

FIG. 3 is a schematic diagram of a system illustrating transmitter and a receiver over a point-to-point medium according to one embodiment.

A transmitter 30 and a receiver 31 are connected over a point-to-point medium 19. It is to be noted that the transmitter 30 and the receiver 31 are defined here as such in relation to the point-to-point medium 19. In other words, the transmitter 30 can also be a receiver for other links and the receiver 31 can be a transmitter for other links.

The point-to-point medium 19 is used for communication between only two entities and can e.g. be a CPRI link between the baseband module 1 and the combiner 6 of FIG. 1 and/or an IF link over Ethernet between the combiner 6 and one or more of the remote radio heads 8a-c of FIG. 1. Alternatively or additionally, the link can be a link between the baseband module 1 and one or more of the remote radio heads 8a-c of FIG. 1. The point-to-point medium 19 has a direction of communication from the transmitter 30 to the receiver 31 as indicated by the arrow and can be used for uplink or downlink. Optionally, two separate links are used to provide both uplink and downlink communication. Hence, the transmitter 30 can e.g. be the baseband module 1, the combiner 6 or one or more of the remote radio heads. Analogously, the receiver 31 can e.g. be the baseband module 1, the combiner 6 or one or more of the remote radio heads, as long as there is a point-to-point medium to the transmitter 30. Specifically, the point-to-point medium is not a link between a radio base station and a wireless device. In this way, redundant resources which are assigned to the radio interface can be utilised here for control data. Such redundant data can e.g. be zero signals on zero subcarriers which reduce filter requirements and the leakage between frequency bands.

Optionally, the transmitter 30 comprises a modulator 10 and a Digital to Analogue (D/A) converter 11 if the point-to-point medium 19 is an analogue communication link such as IF. If the point-to-point medium 19 is a digital communication link, such as CPRI, then the D/A converter 11 is not needed. An input 18 is used to receive data such as primary data PD and control data CD. The data provided on the input 18 is synchronised in terms of the start and the end of an OFDM symbol Optionally, the receiver 31 comprises an Analogue to Digital (A/D) converter 21 which converts the signal received over the point-to-point medium 19 to digital representation, if the point-to-point medium is an analogue communication link such as IF. If the point-to-point medium 19 is a digital communication link, such as CPRI, then the A/D converter 21 is not needed. A demodulator 20 extracts the control data CD and the primary data PD. The control data CD is provided as an output from the receiver 31 and the primary data is provided separately.

The receiver 31 can also include a modulator 10 to again modulate the primary data PD output from the demodulator 20, along with zero subcarriers such that the output from the receiver 31 is restored to a format which complies with standard specifications, e.g. for LTE.

Optionally, the control data is provided with sufficiently low amplitude that the sub-carriers of the control data do not need to be replaced with zero subcarriers. This can be performed if the amount of required control data is small. The amplitude should then be low enough such that the resulting signal still fulfils transmission signal requirements, e.g. in terms of ACLR (Adjacent Channel Leakage Ratio) and spurious emission. Thus, the control data may not need to be stripped out before the transmission signal is transmitted over the air, or before it reaches baseband processing. This simplifies the implementation of the receiver 31, e.g. by using a digital filter and a smaller FFT for the control data only. In some cases, it may even be possible to avoid the FFT altogether and just use a filter and a demodulator to extract the control data.

The receiver 31 provides a transmission signal Tx which is suitable for transmission over the air. In fact, when the zero signals are reinserted on the subcarriers used for the control data or when the control data is of sufficiently low amplitude, the resulting transmission signal Tx is fully standard compliant for over the air transmission.

In the uplink, single-carrier frequency-division multiple-access (SC-FDMA) is used in LTE. The embodiment described above is readily applicable to SC-FDMA by performing a frequency domain equalization and transforming the received signal back to the time domain. Frequency domain equalization is performed in any LTE uplink receiver and therefore does not dictate a new requirement.

Figure 4:
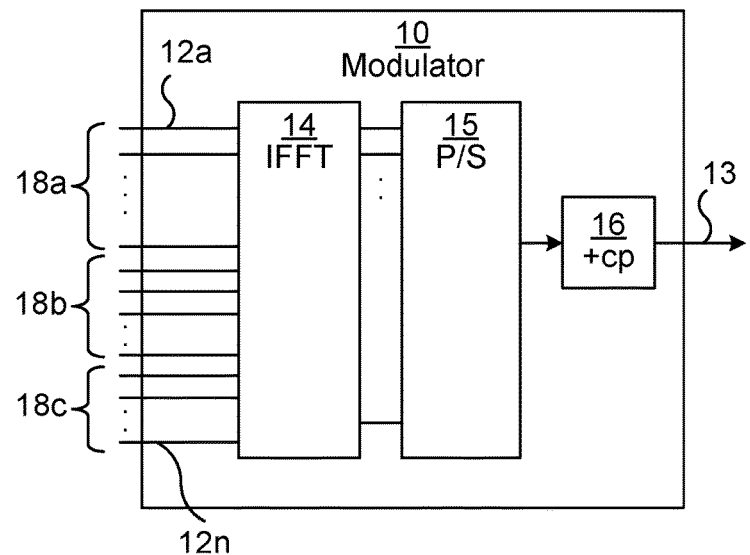
FIG. 4 is a schematic diagram illustrating a modulator of FIG. 3 according to one embodiment.

FIG. 4 is a schematic diagram illustrating a modulator 10 of FIG. 3 according to one embodiment. The modulator 10 comprises an inverse fast Fourier transform (IFFT) module 14, a parallel to serial converter 15 and a cyclic prefix (CP) generator 16.

The modulator 10 has a number (n) of frequency component inputs 12a-n which are fed to the IFFT module 14. The inputs to the modulator 10 are here grouped in three groups. A first group 18a contains frequency component inputs (subcarriers) which relate to primary data. On each frequency component input of the first group 18a, one transmit symbol is provided at a time. Together, all transmit symbols provided on the component inputs of the first group constitute one OFDM symbol.

A second group 18b contains frequency component inputs (subcarriers) which relate to control data. A third group 18c contains frequency component inputs (subcarriers) which are zero, i.e. zero subcarriers. The zero subcarriers are used to allow a feasible time-domain reconstruction filter. Without the zero subcarriers there would be no oversampling and, a perfect analogue brick-wall filter would be required after the D/A converter 11 in order to remove images from higher Nyqvist zones while keeping the modulated subcarriers intact. Since it is not possible to implement brick-wall filters in practice, zero tones are added and serve the purpose of oversampling the signal. More zero tones means that the steepness of the reconstruction filter is reduced.

Moreover, the zero subcarriers are used to fill up remaining sub-carriers to get an IFFT size that is two to the power of an integer (more computationally efficient), as explained below. Another benefit of the zero subcarriers is that they can act as a guard band between OFDM carriers.

However, when the modulator and demodulator communicate via a point-to-point medium 19, part of the subcarriers assigned to be zero subcarriers for the wireless interface can be utilised for other purposes. Specifically, these subcarriers here form the second group 18b and are thus used for control data when the point-to-point medium 19 is not a wireless interface between a radio base station and a wireless device.

The subcarriers of the second group 18b need to be known by both the transmitter 30 and the receiver 31. This can be pre-configured in both ends or signalled using another control channel.

The IFFT module 14 operates to convert the frequency component inputs to time domain samples, which are samples being complex numbers. When the number of frequency component inputs is equal to two to the power of an integer, the IFFT module 14 can be implemented with great efficiency. Hence, the IFFT module 14 is typically implemented with the number of inputs being a number which is two to the power of an integer which has at least as many frequency component inputs that are provided to the modulator 10 in the first group 18a, i.e. primary data inputs. For instance, LTE with 10 MHz bandwidth has 600 subcarriers for primary data, so the closest two to the power of an integer that is larger than 600 is 1024 (2^10). This leaves 1024−600=424 subcarriers which can be split between the second group 18b and the third group 18c. To be complete, there is one additional direct current (DC) subcarrier in the downlink, which then reduces the number of zero subcarriers to 423 for the downlink. In the prior art, all of the 424 spare subcarriers are fed with zero subcarriers, i.e. the second group 18b is empty.

The time domain symbols are provided by the IFFT module 14 to the parallel to serial converter 15 which serialises the time domain symbols to one stream of symbols, which are fed to the CP generator 16. The CP generator 16 generates CP symbols 32, which are copies of a subset of the serialised symbols which form part of the main section. Specifically, the CP is generated by copying the last $n_{CP}$ symbols of the main section and adding the symbols to the beginning of the output from the parallel to serial converter 15.

The primary data subcarriers of the first group 18a form part of a transmission signal in accordance with LTE. The control data subcarriers 18b can be of any suitable format as long as the control data on each control data subcarrier conforms with a frequency range assigned for that particular subcarrier input.

Distortions over the point-to-point medium connecting the two system components are typically less severe than those over the wireless channel. Hence, a more spectrally efficient modulation and coding scheme may be employed for the control data exchange. In order to facilitate channel estimation, reference symbols may be inserted together with the control data. Alternatively, the reference symbols already present in the regular transmit signal stream may be utilised to facilitate channel estimation.

On the other hand, if low decoding complexity at the receiver 31 is a priority, then a simple modulation scheme such as on-off keying or differential modulation may be utilised. For on-off keying or differential modulation, no channel estimation for control data detection is needed.

It is to be noted that the size of the second group 18b is selected such that the third group 18c comprises sufficient number of zero subcarriers to provide a sufficient level of oversampling. This ensures that a D/A conversion of the time domain OFDM signal with realizable filters is possible The third group, comprising the zero subcarriers is placed at the first or last subcarriers of the IFFT.

Each transmission block of control data may be encoded with a forward error correction (FEC) code with rate r to form a codeword. The robustness against transmission errors may be further increased by adding a number of bits for a cyclic redundancy check (CRC) and/or ACK/NACK (Acknowledgement/Negative acknowledgement) bits for an automatic repeat request (ARQ) protocol.

If there are $n_{cd}$ subcarriers in the second group 18b, carrying control data, then 14 $n_{cd}$ symbols can be used for control data per subframe. With a subframe duration of 1 ms, the control data transmission rate becomes 14000 $n_{cd}$ symbols per second, which translates to 14 $n_{cd}$ m r kbps (kilo bits per second), where m denotes the modulation order in bits per symbol and r is the FEC code rate.

Figure 5:
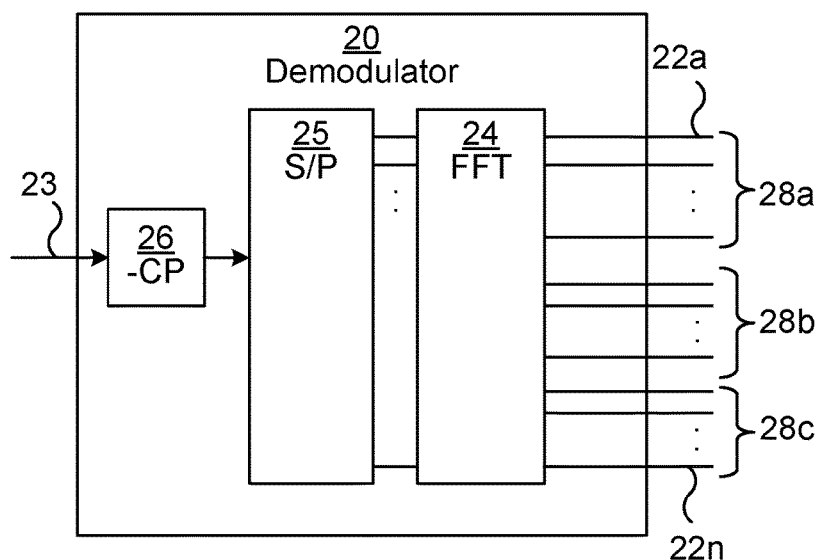
FIG. 5 is a schematic diagram illustrating a demodulator of FIG. 3 according to one embodiment.

FIG. 5 is a schematic diagram illustrating a demodulator of FIG. 3 according to one embodiment. The demodulator 20 corresponds to the modulator 10, but in reverse.

Hence, the demodulator 20 comprises a cyclic prefix (CP) remover 26, a serial to parallel converter 25 and a fast Fourier transform (FFT) module 24.

The demodulator 20 has one demodulator input 23 and a number of frequency component outputs 22a-n supplied by the FFT module 24. In analogy with the modulator 10, the n outputs 22a-n of the demodulator 20 can be grouped in three groups. A first group 28a contains frequency component outputs which relate to primary data. A second group 28b contains frequency component outputs which relate to control data. A third group 28c contains frequency component outputs which are zero, i.e. zero data. The primary data subcarriers of the first group 28a form part of a transmission signal in accordance with LTE.

Looking now to the signal flow through the demodulator 20, the CP remover 26 receives the signal on the demodulator input and removes CP samples 32 of each received element. As long as the reception occurred successfully, this removal can be safely done since the CP only contains copies of serialised samples which form part of the main section.

The main section of the samples (without CP) are then provided to the serial to parallel converter 25 which distributes the samples on a plurality of parallel channels to the FFT module 24.

The FFT module 24 operates to convert the time domain samples to frequency component outputs, i.e. subcarriers. In analogy with the IFFT module 14, when the number of frequency component outputs is equal to two to the power of an integer, the FFT module 24 can be implemented with great efficiency. Hence, the FFT module 24 is typically implemented with the number of inputs being a number which is two to the power of an integer which has at least as many frequency component outputs that are provided from the demodulator 20 in the first group 28a, i.e. primary data outputs.

Figure 6A:
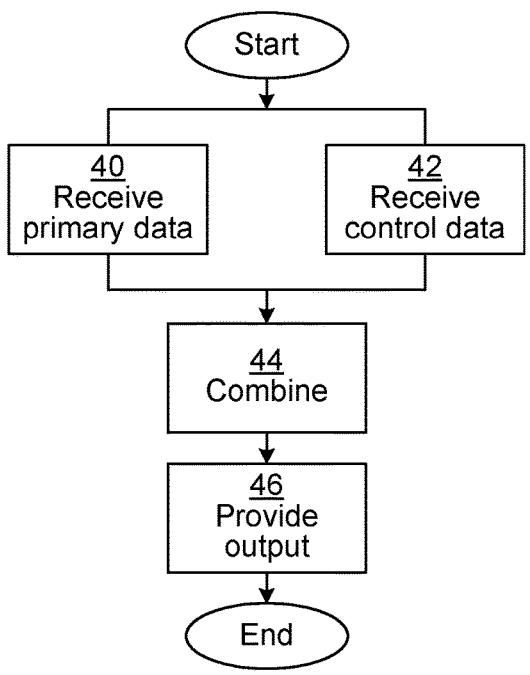
FIGS. 6A-B are flow charts illustrating embodiments of methods for inserting control data performed in the modulator of FIG. 3.
Figure 6B:
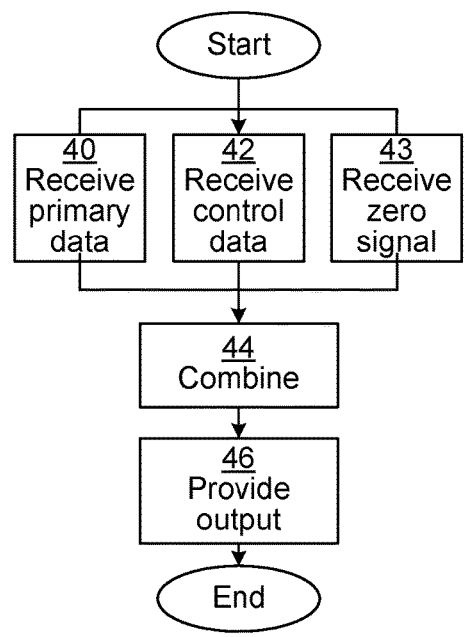

FIGS. 6A-B are flow charts illustrating embodiments of methods for inserting control data performed in the modulator of FIG. 3. As explained above, the modulator 10 comprises a plurality of frequency component inputs and a modulator output.

In a receive primary data step 40, primary data subcarriers are received on respective frequency component inputs which are assigned for receiving primary data, i.e. in the first group 18a of FIG. 4.

In a receive control data step 42, at least one control data subcarrier is received on a respective frequency component input which is not assigned to primary data, in the second group 18b of FIG. 4. In one embodiment, this step comprises receiving the at least one control data subcarrier on a respective frequency component input for which power needs to be suppressed when transmitted over the air to avoid leakage to a neighbouring frequency band. For instance, the control data subcarriers can be subcarriers which would be zero subcarriers when transmitting over the air between a radio base station and a wireless device.

The steps of receiving primary data and receiving control data can be performed in parallel, since primary data and control data are received on separate subcarriers to the modulator. The primary data subcarriers can form part of a transmission signal in accordance with LTE. In this way, the primary data can be used for transmission over the wireless link.

In one embodiment, as explained above, the number of frequency component inputs is equal to two to the power of an integer.

In a combine step 44, all frequency component inputs are combined to one output signal. This can comprise performing an IFFT and a parallel to serial conversion as explained above.

In provide output step 46, the output signal is provided on the output for transmission to a demodulator over a point-to-point medium.

Looking now to FIG. 6B, only new or modified steps compared to the method illustrated by the flow chart of FIG. 6A will be described.

In a receive zero signal step 43, zero signals are received on frequency component inputs which are neither used for primary data nor for control data, i.e. in the third group 18c of FIG. 4.

Figure 7A:
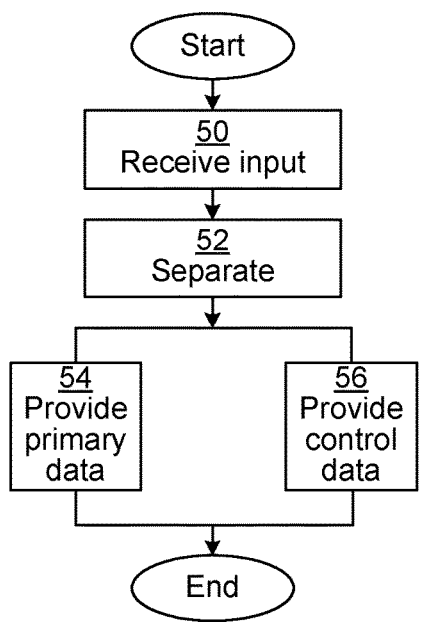
FIGS. 7A-B are flow charts illustrating embodiments of methods for extracting control data performed in the demodulator of FIG. 3.
Figure 7B:
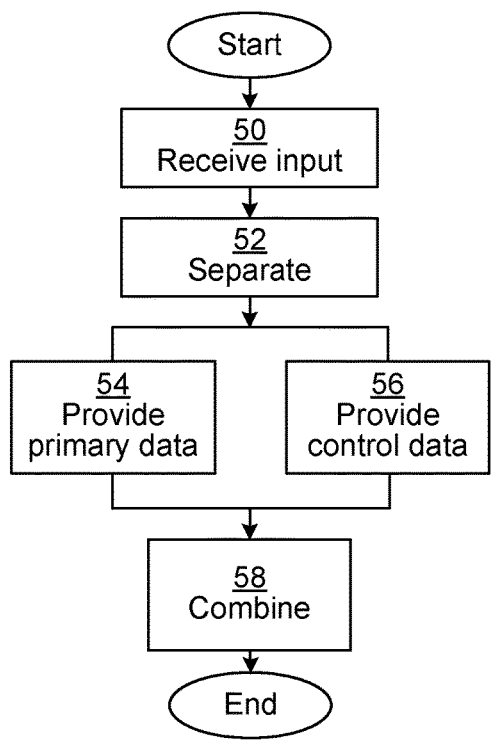

FIGS. 7A-B are flow charts illustrating embodiments of methods for extracting control data performed in the demodulator of FIG. 3. As explained above, the demodulator comprises a plurality of frequency component outputs and a demodulator input.

In a receive input step 50 one input signal is received on the input. The input signal has been transferred from a modulator over a point-to-point medium.

In a separate step 52, frequency components of the input signal are separated to the plurality of subcarriers for respective frequency component outputs.

This step can comprise performing a serial to parallel conversion and an FFT as explained above.

In one embodiment, as explained above, the number of frequency component output is equal to two to the power of an integer.

In a provide primary data step 54, primary data subcarriers are provided on respective frequency component outputs which are assigned for providing primary data. The primary data subcarriers can form part of a transmission signal in accordance with Long Term Evolution, LTE. In this way, the primary data can be used for transmission over the wireless link. These primary data subcarriers correspond to the primary data subcarriers input to the modulator.

In a provide control data step 56, at least one control data subcarrier is provided on a respective frequency component output which is not assigned to primary data. This one or more control data subcarriers correspond to the control data subcarriers input to the modulator.

The steps of providing primary data and providing control data can be performed in parallel, since primary data and control data are provided on separate subcarriers from the demodulator.

Looking now to FIG. 7B, only new or modified steps compared to the method illustrated by the flow chart of FIG. 7A will be described.

In a combine step 58, the frequency components which are assigned for providing primary data are combined with zero signals for frequency components which were used for control data subcarriers.

FIG. 8 is a schematic diagram showing some components of an embodiment of the modulator of FIG. 3. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 6A-B above.

The memory 64 can be any combination of random access memory (RAM) and read only memory (ROM). The memory 64 also comprises persistent storage, which, for example, can be any single one or combination of magnetic memory, optical memory, solid state memory or even remotely mounted memory.

A data memory 69 is also provided for reading and/or storing data during execution of software instructions in the processor 60. The data memory 69 can be any combination of random access memory (RAM) and read only memory (ROM).

The modulator further comprises an I/O interface 67 for communicating with other external entities, e.g. over a point-to-point interface to a demodulator. Optionally, the I/O interface 67 also includes a user interface.

FIG. 9 is a schematic diagram showing some components of an embodiment of the demodulator of FIG. 3. A processor 70 is provided using any combination of one or more of a suitable central processing unit (CPU), multiprocessor, microcontroller, digital signal processor (DSP), application specific integrated circuit etc., capable of executing software instructions 76 stored in a memory 74, which can thus be a computer program product. The processor 70 can be configured to execute the method described with reference to FIGS. 7A-B above.

The memory 74 can be any combination of random access memory (RAM) and read only memory (ROM). The memory 74 also comprises persistent storage, which, for example, can be any single one or combination of magnetic memory, optical memory, solid state memory or even remotely mounted memory.

A data memory 79 is also provided for reading and/or storing data during execution of software instructions in the processor 70. The data memory 79 can be any combination of random access memory (RAM) and read only memory (ROM).

The demodulator further comprises an I/O interface 77 for communicating with other external entities, e.g. over a point-to-point interface to a modulator. Optionally, the I/O interface 77 also includes a user interface.

FIG. 10 is a schematic diagram showing functional modules of the software instructions of the modulator of FIG. 3 or FIG. 8 according to one embodiment. The modules are implemented using software instructions such as a computer program executing in the modulator. The modules correspond to the steps in the methods illustrated in FIGS. 6A-B.

A receiver 80 corresponds to steps 40, 42 and 43. A combiner 84 corresponds to step 44. An output provider 86 corresponds to step 46.

FIG. 11 is a schematic diagram showing functional modules of the software instructions of the demodulator of FIG. 3 or FIG. 9 according to one embodiment. The modules are implemented using software instructions such as a computer program executing in the demodulator. The modules correspond to the steps in the methods illustrated in FIGS. 7A-B.

A receiver 93 corresponds to step 50. A separator 92 corresponds to step 52. An output provider 95 corresponds to steps 54 and 56. A combiner 98 corresponds to step 58.

FIG. 12 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8 or the computer program product 74 of FIG. 9. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for inserting control data in a modulator comprising a plurality of frequency component inputs and a modulator output, the method being performed in the modulator and comprising:
receiving primary data subcarriers on respective frequency component inputs which are assigned for receiving primary data;
receiving at least one control data subcarrier on a respective frequency component input which is not assigned to primary data; wherein receiving the at least one control data subcarrier comprises receiving the at least one control data subcarrier on a respective frequency component input for which power needs to be suppressed when transmitted over the air to avoid leakage to a neighbouring frequency band;
combining all frequency component inputs to one output signal; and
providing the output signal on the output for transmission to a demodulator over a point-to-point medium.

2. The method according to claim 1, wherein the step of combining comprises performing an inverse fast Fourier transform and a parallel to serial conversion.

3. The method according to claim 1, wherein the number of frequency component inputs is equal to two to the power of an integer.

4. The method according to claim 1, wherein the steps of receiving primary data subcarriers and receiving at least one control data subcarrier are performed in parallel.

5. The method according claim 1, further comprising the step of:
receiving zero signals on frequency component inputs which are neither used for primary data nor for control data.

6. The method according to claim 1, wherein the primary data subcarriers form part of a transmission signal in accordance with Long Term Evolution, LTE.

7. A modulator for inserting control data, the modulator comprising:
a plurality of frequency component inputs;
a modulator output;
a processor; and
a memory storing instructions that, when executed by the processor, cause the modulator to:
receive primary data subcarriers on respective frequency component inputs which are assigned for receiving primary data;
receive at least one control data subcarrier on a respective frequency component input which is not assigned to primary data; wherein the instructions to receive at least one control data subcarrier comprise instructions that, when executed by the processor, cause the modulator to receive the at least one control data subcarrier on a respective frequency component input for which power needs to be suppressed when transmitted over the air to avoid leakage to a neighbouring frequency band;
combine all frequency component inputs to one output signal; and
provide the output signal on the output for transmission to a demodulator over a point-to-point medium.

8. The modulator according to claim 7, wherein the instructions to combine comprise instructions that, when executed by the processor, cause the modulator to perform an inverse fast Fourier transform and a parallel to serial conversion.

9. The modulator according to claim 7, wherein the number of frequency component inputs is equal to two to the power of an integer.

10. The modulator according to claim 7, wherein the instructions to receive primary data subcarriers and the instructions to receive at least one control data subcarrier are executed in parallel.

11. The modulator according to claim 7, further comprising instructions that, when executed by the processor, cause the modulator to:
receive zero signals on frequency component inputs which are neither used for primary data nor for control data.

12. The modulator according to claim 7, wherein the primary data subcarriers form part of a transmission signal in accordance with Long Term Evolution, LTE.

13. A method for extracting control data in a demodulator comprising a plurality of frequency component outputs and a demodulator input, the method being performed in the demodulator and comprising: receiving one input signal on the input, the input signal having been transferred from a modulator over a point-to-point medium;
separating frequency components of the input signal to the plurality of subcarriers for respective frequency component outputs;
providing primary data subcarriers on respective frequency component outputs which are assigned for providing primary data; and
providing at least one control data subcarrier on a respective frequency component output which is not assigned to primary data; wherein providing the at least one control data subcarrier comprises providing the at least one control data subcarrier on a respective frequency component input for which power needs to be suppressed when transmitted over the air to avoid leakage to a neighbouring frequency band.

14. The method according to claim 13, wherein the step of separating comprises performing a serial to parallel conversion and a fast Fourier transform.

15. The method according to claim 13, wherein the number of frequency component outputs is equal to two to the power of an integer.

16. The method according to claim 13, wherein the steps of providing primary data and providing control data are performed in parallel.

17. The method according to claim 13, further comprising the step of:
  combining the frequency components which are assigned for providing primary data and zero signals for frequency components which were used for control data subcarriers.

18. The method according to claim 13, wherein the primary data subcarriers form part of a transmission signal in accordance with Long Term Evolution (LTE).

* * * * *